United States Patent
Matsushima et al.

(10) Patent No.: US 6,708,570 B2
(45) Date of Patent: Mar. 23, 2004

(54) FLOW RATE MEASUREMENT METHOD, ULTRASONIC FLOW RATE METER, FLOW VELOCITY MEASUREMENT METHOD, TEMPERATURE OR PRESSURE MEASUREMENT METHOD, ULTRASONIC THERMOMETER AND ULTRASONIC PRESSURE GAGE

(75) Inventors: Keiichi Matsushima, Gyoda (JP); Michio Ohkawa, Gyoda (JP); Eisaku Komatsu, Gyoda (JP)

(73) Assignee: Surpass Industry Co., Ltd., Saitama-ken (JP)

( * ) Notice: Subject to any disclaimer, the term of this patent is extended or adjusted under 35 U.S.C. 154(b) by 0 days.

(21) Appl. No.: 10/020,132

(22) Filed: Dec. 18, 2001

(65) Prior Publication Data

US 2002/0078760 A1 Jun. 27, 2002

(30) Foreign Application Priority Data

Dec. 27, 2000 (JP) ......................... 2000-396567

(51) Int. Cl.⁷ .................................... G01F 1/66
(52) U.S. Cl. .................................. 73/861.28
(58) Field of Search .................. 73/861.28, 861.27, 73/861.29, 861.31, 64.53, 61.79

(56) References Cited

U.S. PATENT DOCUMENTS

| | | | | |
|---|---|---|---|---|
| 3,751,979 A | * | 8/1973 | Ims ......................... 73/861.27 |
| 4,363,242 A | * | 12/1982 | Heyman ....................... 73/761 |
| 5,052,230 A | * | 10/1991 | Lang et al. ............... 73/861.28 |
| 5,214,955 A | * | 6/1993 | Yost et al. ................. 73/24.05 |
| 5,987,997 A | * | 11/1999 | Roskam et al. .......... 73/861.29 |
| 6,209,388 B1 | * | 4/2001 | Letton et al. .............. 73/61.79 |

FOREIGN PATENT DOCUMENTS

| JP | 10-9914 | 1/1998 |
|---|---|---|
| JP | 10-122923 | 5/1998 |
| JP | 2000-180228 | 6/2000 |

* cited by examiner

*Primary Examiner*—Edward Lefkowitz
*Assistant Examiner*—Jewel V. Thompson
(74) *Attorney, Agent, or Firm*—Sughrue Mion, PLLC

(57) ABSTRACT

An flow rate measurement method and a ultrasonic flow meter is provided, which can measure a flow velocity accurately by utilizing a ultrasonic wave having a frequency by which a phase difference becomes zero. According to the flow rate measurement method, a reference ultrasonic velocity is prepared such that the fluid is in a standard condition, firstly. Then, an absolute ultrasonic velocity in the fluid and a temporary flow velocity $V_0$ in the fluid are obtained. Then, the temporary flow velocity $V_0$ is corrected by using the difference between the reference ultrasonic velocity and the absolute ultrasonic velocity thereby to determine an accurate flow velocity of the fluid, and to determine a flow rate of the fluid by using the accurate flow velocity and a cross section area of the conduit.

17 Claims, 3 Drawing Sheets

FLOW RATE MEASUREMENT METHOD, ULTRASONIC FLOW RATE METER, FLOW VELOCITY MEASUREMENT METHOD, TEMPERATURE OR PRESSURE MEASUREMENT METHOD, ULTRASONIC THERMOMETER AND ULTRASONIC PRESSURE GAGE

TECHNICAL FIELD

The present invention relates to a method for measuring a flow rate and a flow velocity of a fluid by utilizing ultrasonic wave, and an ultrasonic flow rate meter. And, it also relates to a method for measuring a temperature or pressure of a fluid without contact by utilizing ultrasonic wave, and an ultrasonic thermometer and an ultrasonic pressure gage.

BACKGROUND ART

Recently, for a flow rate meter for measuring a flow rate of a fluid, an ultrasonic flow rate meter which utilizes ultrasonic wave has been used.

In the ultrasonic flow rate meter, oscillators are disposed in a conduit for flowing the fluid at a longitudinal direction spaced. And, an ultrasonic wave is emitted from the one oscillator and received by the other oscillator, while an ultrasonic wave are emitted from the other oscillator and received by the one oscillator. By a difference in a nultrasonic wave propagation time from the emission to the reception in each case, a flow velocity of the fluid in the conduit is obtained, whereby a flow rate thereof will be determined.

And, for a thermometer or a pressure gage for measuring a temperature or a pressure of a fluid, an ultrasonic thermometer or an ultrasonic pressure gage, which utilize a semiconductor sensor, has been proposed.

PROBLEMS TO BE SOLVED BY THE INVENTION

Such the conventional ultrasonic flow rate meter employs the time difference method or the phase difference method, as measurement method. The ultrasonic wave propagation time varies according to a property, a temperature and a pressure condition of the propagation material. If a flow rate is so large that a variation range in the propagation time can be neglected as an error, there will be no problem. However, when the flow rate is too small for the variation range, it will be difficult to determine the flow rate accurately due to such the variations.

And, it is difficult to arrange such the conventional thermometer or the pressure gage at a same place where a flow velocity is measured by an ultrasonic flow meter. Also, it is difficult to measure a temperature or a pressure of a fluid without contact to the fluid without preventing the fluid flow.

In view of the problems, the object of the present invention is to provide a flow rate measurement method and a flow velocity measurement method by utilizing an improved measurement method (a frequency variable method) by which a flow rate can be measured accurately, and an ultrasonic flow rate meter. In the method, because a phase of the received ultrasonic wave varies in response to a flow velocity V in the conduit, a frequency of the transmitted ultrasonic wave will be changed by a PLL circuit such that the phase becomes equal to a phase under a condition of a flow velocity in the conduit being zero (V=0). Here, since the changed frequency relates a flow velocity, measuring the difference in the frequency will determine the flow velocity accurately.

Further, the object of the present invention is to provide, a temperature and a pressure measurement methods by utilizing an improved measurement method (a frequency variable method) by which a temperature or a pressure can be measured accurately, an ultrasonic thermometer and an ultrasonic pressure gage. In the method, because a phase of the received ultrasonic wave varies in response to a time difference of an ultrasonic velocity in the conduit, the time difference being caused by a change in a temperature or a pressure of the fluid in the conduit, a frequency of the transmitted ultrasonic wave will be changed by a PLL circuit such that the phase becomes equal to a phase under a condition of a reference temperature (for example, 20° C.) in the conduit. Since the changed frequency relates a temperature and a pressure in the conduit, measuring the difference in the frequency will be determine the temperature or the pressure of the fluid in the conduit accurately.

MEANS FOR SOLVING THE PROBLEMS

In order to solve the problems, the present invention provides a flow rate measurement method, which measures a flow rate of a fluid flowing through a conduit, comprises the following steps: preparing a reference ultrasonic velocity such that the fluid is in a standard condition, measuring an ultrasonic velocity A by transmitting an ultrasonic wave from one side and receiving the ultrasonic wave at the other side in the fluid flowing through the conduit, measuring an ultrasonic velocity B by transmitting an ultrasonic wave from the other side and receiving the ultrasonic wave at the one side in the fluid flowing through the conduit, averaging the ultrasonic velocity A and the ultrasonic velocity B thereby to obtain an absolute ultrasonic velocity in the fluid, dividing a difference between the ultrasonic velocity A and the ultrasonic velocity B by 2 thereby to obtain a temporary flow velocity of the fluid, correcting the temporary flow velocity by using a difference between the reference ultrasonic velocity and the absolute ultrasonic velocity thereby to determine an accurate flow velocity of the fluid, and determining a flow rate of the fluid by using the accurate flow velocity and a cross section area of the conduit.

In the flow rate measurement method according to the present invention, the ultrasonic velocities A and B, variable by a temperature or a pressure of the fluid flowing through the conduit, are obtained by a transmission and a reception of an ultrasonic wave. So, an accurate flow velocity can be determined by correcting the temporary flow velocity without measurement of a temperature or a pressure of the fluid. Accordingly, a flow rate of the fluid can be determined accurately.

The ultrasonic flow rate meter according to the present invention, which measures a flow rate of a fluid flowing through a conduit, comprises the following devices: a first ultrasonic wave transmission and reception device disposed on the outside of the conduit, a second ultrasonic wave transmission and reception device disposed on the outside of the conduit part away from the first ultrasonic wave transmission and reception device, a first phase difference detector connected to the second ultrasonic wave transmission and reception device, a first PLL type loop connection disposed between the first phase difference detector and the first ultrasonic wave transmission and reception device, a second phase difference detector connected to the first ultrasonic wave transmission and reception device, a second PLL type loop connection disposed between the second phase difference detector and the second ultrasonic wave transmission and reception device, and a measurement controller for obtaining a flow rate of the fluid.

The ultrasonic flow rate meter according to the present invention is provided with a measurement controller, which measures, controls and operates in a manner described as follows. In a fluid flowing through a conduit at a flow velocity Vx, an ultrasonic wave transmitted from the first ultrasonic wave transmission and reception device is received by the second ultrasonic wave transmission and reception device. Then, a phase difference in the ultrasonic wave at the transmission and the reception will be detected by the first phase difference detector.

When the phase difference is detected, a transmission frequency of the first ultrasonic wave transmission and reception device is gradually changed by the first loop connection until the phase difference becomes zero, and thus a transmission frequency is determined when the phase difference becomes zero. From the determined transmission frequency or the wavelength, an ultrasonic velocity A in the fluid will be obtained.

Next, an ultrasonic wave transmitted from the second ultrasonic wave transmission and reception device is received by the first ultrasonic wave transmission and reception device. Then, a phase difference in the ultrasonic wave at the transmission and the reception is detected by the second phase difference detector.

When the phase difference will be detected, a transmission frequency of the second ultrasonic wave transmission and reception device is gradually changed by the second loop connection until the phase difference becomes zero, and thus a transmission frequency is determined when the phase difference becomes zero. From the determined transmission frequency or the wavelength, an ultrasonic velocity B in the fluid will be obtained.

Then, an average of the ultrasonic velocity A and the ultrasonic velocity B is calculated in order to obtain an absolute ultrasonic velocity in the fluid. Next, a difference between the ultrasonic velocity A and the ultrasonic velocity B is divided by 2 in order to determine a temporary flow velocity of the fluid. Next, a reference ultrasonic velocity is prepared such that the fluid is in a standard condition. Then, by using a difference between the reference ultrasonic velocity and the absolute ultrasonic velocity, the temporary flow velocity will be corrected, whereby an accurate flow velocity Vx of the fluid is obtained.

Then, the obtained flow velocity Vx and a cross section area of the conduit can determine a flow rate of the fluid. Accordingly, the accurate flow velocity of the fluid can be obtained by utilizing such a frequency that the phase difference in an ultrasonic wave becomes zero, without measurement of a temperature or a pressure of the fluid.

In the ultrasonic flow rate meter according to the present invention, the first ultrasonic wave transmission and reception device may be constructed of a first ultrasonic wave transmitter and a first ultrasonic wave receiver, and the second ultrasonic wave transmission and reception device may be constructed of a second ultrasonic wave transmitter and a second ultrasonic wave receiver. And, the first phase difference detector and the second phase difference detector may be combined to be a phase difference detector. Also, the first loop connection and the second loop connection may be combined to be a loop connection.

The ultrasonic flow rate meter according to the present invention, which measures a flow rate of a fluid flowing through a conduit, comprises the following devices: an ultrasonic wave transmitter disposed in the conduit, an ultrasonic wave receiver disposed at a predetermined distance from the ultrasonic wave transmitter, a PLL circuit connected to the ultrasonic wave transmitter and the ultrasonic wave receiver, and a measurement controller for obtaining an oscillating frequency of an oscillator and converting the oscillating frequency to a flow rate. The PLL circuit has a phase difference detector for detecting a phase difference between an ultrasonic wave transmitted from the ultrasonic wave transmitter and an ultrasonic wave received by the ultrasonic wave receiver, an integrating circuit for integrating an output waveform outputted from the phase difference detector, and said oscillator, which is controlled by an output signal outputted from the integrating circuit.

Further, an ultrasonic flow rate meter according to the present invention may comprise two sets of the ultrasonic flow rate meter.

The ultrasonic flow rate meter according to the present invention, which measures a flow rate of a fluid flowing through a conduit, comprises the following devices: an ultrasonic wave transmitter disposed in the conduit, a first ultrasonic wave receiver and a second ultrasonic wave receiver disposed at a predetermined distance from the ultrasonic wave transmitter in the opposite direction respectively, a PLL circuit connected to the ultrasonic wave transmitter, a switching device connected to the PLL circuit, and a measurement controller for obtaining an oscillating frequency of an oscillator and converting the oscillating frequency to a flow rate. The switching device alternatively changes connection of the PLL circuit to be connected either to the first ultrasonic wave receiver or to the second ultrasonic wave receiver. And, the PLL circuit has a phase differences detector for detecting a phase difference between an ultrasonic wave transmitted from the ultrasonic wave transmitter and an ultrasonic wave received by the first or the second ultrasonic wave receiver respectively, an integrating circuit for integrating an output waveform outputted from the phase difference detector, and said oscillator, which is controlled by an output signal outputted from the integrating circuit.

The ultrasonic flow rate meter according to the present invention, which measures a flow rate of a fluid flowing through a conduit, comprises the following devices: an ultrasonic wave generator for generating an ultrasonic wave, an ultrasonic wave transmitter disposed in the conduit, the transmitter transmitting an ultrasonic wave generated from the ultrasonic wave generator, an ultrasonic wave receiver disposed at a predetermined distance from the ultrasonic wave transmitter, a phase difference detector for detecting a phase difference between an ultrasonic wave transmitted from the ultrasonic wave transmitter and an ultrasonic wave received by the ultrasonic wave receiver, an integrating circuit for integrating an output waveform outputted from the phase difference detector, an oscillator controlled by an output signal outputted from the integrating circuit, and a measurement controller for obtaining an oscillating frequency of the oscillator and converting the oscillating frequency to a flow rate.

The ultrasonic flow rate meter according to the present invention, which measures a flow rate of a fluid flowing through the conduit, comprises the following devices: a first ultrasonic wave transmission and reception device disposed in the conduit, a second ultrasonic wave transmission and reception device disposed at a predetermined distance from the first ultrasonic wave transmission and reception device, a switching device connected to the first and second ultrasonic wave transmission and reception devices, a PLL circuit connected to the switching device, and a measurement controller for obtaining an oscillating frequency of an oscillator and converting the oscillating frequency to a flow rate. The switching device alternatively changes connection of the PLL circuit such that the input thereof is connected to the first ultrasonic wave transmission and reception device and also the output thereof is connected to the second ultrasonic wave transmission reception device, or such that the input thereof is connected to the second ultrasonic wave transmission and reception device and also the output thereof is connected to the first ultrasonic wave transmission and reception device. And, the PLL circuit has a phase difference detector for detecting a phase difference between an ultrasonic wave transmitted from the first or the second ultrasonic wave transmission and reception device and an ultrasonic wave received by the second or the first ultrasonic wave transmission and reception device, an integrating circuit for integrating an output waveform outputted from the phase difference detector and an oscillator controlled by an output signal outputted from the integrating circuit.

The ultrasonic flow rate meter according to the present invention, which measures a flow rate of a fluid flowing through a conduit, comprises the following devices: an ultrasonic wave generator for generating an ultrasonic wave, a first ultrasonic wave transmission and reception device disposed in the conduit, a second ultrasonic wave transmission and reception device disposed in the conduit at a predetermined distance from the first ultrasonic wave transmission and reception device, the devices transmitting and receiving an ultrasonic wave generated from the ultrasonic generator, a switching device connected to the first and second ultrasonic wave transmission and reception devices, a phase difference detector connected to the switching device, the detector detecting a phase difference between an ultrasonic wave transmitted from the first or the second ultrasonic wave transmission and reception device and an ultrasonic wave received by the second or the first ultrasonic wave transmission and reception device respectively, an integrating circuit for integrating an output waveform outputted from the phase difference detector, an oscillator controlled by an output signal outputted from the integrating circuit, and a measurement controller for obtaining an oscillating frequency of the oscillator and converting the oscillating frequency to a flow rate. The switching device alternatively changes connection of the input of the phase difference detector to be connected either to the first ultrasonic wave transmission and reception device, or to the second ultrasonic wave transmission and reception device.

A flow velocity measurement method according to the present invention, which measures a flow velocity of a fluid flowing through a conduit, comprises the following steps: preparing a reference ultrasonic velocity such that the fluid is in a standard condition, measuring an ultrasonic velocity A by transmitting an ultrasonic wave from one side and receiving the ultrasonic wave at the other side in the fluid flowing through the conduit, measuring an ultrasonic velocity B by transmitting an ultrasonic wave from the other side and receiving the ultrasonic wave at the one side in the fluid flowing through the conduit, averaging the ultrasonic velocity A and the ultrasonic velocity B thereby to obtain an absolute ultrasonic velocity in the fluid, dividing a difference between the ultrasonic velocity A and the ultrasonic velocity B by 2 thereby to obtain a temporary flow velocity of the fluid, and correcting the temporary flow velocity by using a difference between the reference ultrasonic velocity and the absolute ultrasonic velocity thereby to determine an accurate flow velocity of the fluid.

A measurement method according to the present invention, which measures a temperature or a pressure of a fluid flowing through a conduit, comprises the following steps: preparing a reference ultrasonic velocity such that the fluid is in a standard condition (for example, at 20° C.), measuring an ultrasonic velocity A by transmitting an ultrasonic wave from one side and receiving the ultrasonic wave at the other side in the fluid flowing through the conduit, measuring an ultrasonic velocity B by transmitting an ultrasonic wave from the other side and receiving the ultrasonic wave at the one side in the fluid flowing through the conduit, averaging the ultrasonic velocity A and the ultrasonic velocity B thereby to obtain an absolute ultrasonic velocity in the fluid, dividing a difference between the ultrasonic velocity A and the ultrasonic velocity B by 2 thereby to obtain a temporary flow velocity of the fluid, correcting the temporary flow velocity by using a difference between the reference ultrasonic velocity and the absolute ultrasonic velocity thereby to determine an accurate flow velocity of the fluid, and multiplying the accurate flow velocity by a cross section area of the conduit thereby to obtain a flow rate, at the same time obtaining a relationship between a temperature and a pressure by the reference ultrasonic velocity and the absolute ultrasonic velocity, and finally obtaining a pressure or a temperature of the fluid by the relationship and a predetermined temperature or a predetermined pressure of the fluid.

In the measurement method for measuring a temperature or a pressure, since the ultrasonic velocities A and B, variable by a temperature and a pressure of the fluid flowing through the conduit, are measured by using a transmission and a reception of an ultrasonic wave, a flow velocity of the fluid can be measured accurately by correction of the temporary flow velocity only, without measurement of a temperature or a pressure of the fluid. At the same time, a relationship between a temperature and a pressure, which is previously provided by the reference ultrasonic velocity and the absolute ultrasonic velocity, and a predetermined temperature or a predetermined pressure of the fluid can determine a pressure and a temperature of the fluid.

Here, the ultrasonic velocity (the absolute ultrasonic velocity) is shown as a function of a flow velocity, a temperature and a pressure of the fluid. Therefore, a measurement of the absolute ultrasonic velocity and the flow velocity can determine a pressure of the fluid as long as a temperature of the fluid is previously known, and a temperature of the fluid as long as a pressure of the fluid is previously known. Accordingly, a flow velocity and a temperature or a pressure can be measured at the same time.

A measurement method according to the present invention, which measures a temperature or a pressure of a fluid flowing through a conduit, comprises the following steps: preparing a reference ultrasonic velocity such that the fluid is in a standard condition (for example, at 20° C.), measuring ultrasonic velocity A by transmitting an ultrasonic wave from one side and receiving the ultrasonic wave at the other side in the fluid flowing through the conduit, measuring ultrasonic velocity B by transmitting an ultrasonic wave from the other side and receiving the ultrasonic wave at the one side in the fluid flowing through the conduit, averaging the ultrasonic velocity A and the ultrasonic velocity B thereby to obtain an absolute ultrasonic velocity in the fluid, obtaining a relationship between a temperature and a pressure by a difference between the reference ultrasonic velocity and the absolute ultrasonic velocity, and obtaining a pressure or a temperature of the fluid by the relationship and a predetermined temperature or a predetermined pressure of the fluid.

In the measurement method for measuring a temperature or a pressure according to the present invention, a relationship between the reference ultrasonic velocity and the absolute ultrasonic velocity is obtained. And, such the relationship and a predetermined temperature or a predetermined pressure of the fluid can determine a pressure and a temperature of the fluid without contact to the fluid.

Here, the ultrasonic velocity (the absolute ultrasonic velocity) is shown as a function of a flow velocity, a temperature and a pressure of the fluid. Therefore, a measurement of the absolute ultrasonic velocity and the flow velocity can determine a pressure of the fluid as long as a temperature of the fluid is previously known, and a temperature of the fluid as long as a pressure of the fluid is previously known.

An ultrasonic thermometer or an ultrasonic pressure gage according to the present invention, which measures a temperature or a pressure of a fluid flowing through a conduit, comprises the following devices: a first ultrasonic wave transmission and reception device disposed on the outside of the conduit, a second ultrasonic wave transmission and reception device disposed on the outside of the conduit, the second device being spaced from the first ultrasonic wave transmission and reception device, a first phase difference detector connected to the second ultrasonic wave transmission and reception device, a first PLL type loop connection disposed between the first phase difference detector and the first ultrasonic wave transmission and reception device, a second phase difference detector connected to the first ultrasonic wave transmission and reception device, a second PLL type loop connection disposed between the second phase difference detector and the second ultrasonic wave transmission and reception device, and a measurement controller for obtaining a temperature or pressure of the fluid.

The ultrasonic thermometer or the ultrasonic pressure gage according to the present invention is provided with a measurement controller, which measures, controls and operates in a manner described as follows. In the fluid flowing through the conduit at the flow velocity Vx, an ultrasonic wave transmitted from the first ultrasonic wave transmission and reception device is received by the second ultrasonic wave transmission and reception device. Then, a phase difference in the ultrasonic wave at the transmission and the reception will be detected by the first phase difference detector.

When the phase difference is detected, a transmission frequency of the first ultrasonic wave transmission and reception device is gradually changed by the first loop connection until the phase difference becomes zero, and thus a transmission frequency is determined when the phase difference becomes zero. From the determined transmission frequency or the wavelength, an ultrasonic velocity A in the fluid will be obtained.

Next, an ultrasonic wave transmitted from the second ultrasonic wave transmission and reception device is received by the first ultrasonic wave transmission and reception device. Then, a phase difference in the ultrasonic wave at the transmission and the reception is detected by the second phase difference detector.

When a phase difference will be detected, a transmission frequency of the second ultrasonic wave transmission and reception device is gradually changed by the second loop connection until the phase difference becomes zero, and thus the transmission frequency is determined when the phase difference becomes zero. From the determined transmission frequency or the wavelength, an ultrasonic velocity B in the fluid will be obtained.

Next, an average of the ultrasonic velocity A and the ultrasonic velocity B is calculated in order to obtain an absolute ultrasonic velocity in the fluid. Then, a difference between the ultrasonic velocity A and the ultrasonic velocity B is divided by 2 in order to determine a temporary flow velocity of the fluid. Next, a reference ultrasonic velocity such that the fluid is in a standard condition (for example, at 20° C.). And, a relationship between a temperature and a pressure, which is previously provided by the reference ultrasonic velocity and the absolute ultrasonic velocity, and a predetermined temperature or a predetermined pressure of the fluid can determine a pressure or a temperature of the fluid.

In the ultrasonic thermometer or the ultrasonic pressure gage according to the present invention, the first ultrasonic wave transmission and reception device may be constructed of a first ultrasonic wave transmitter and a first ultrasonic wave receiver, and the second ultrasonic wave transmission and reception device may be constructed of a second ultrasonic wave transmitter and a second ultrasonic wave. And, the first phase difference detector and the second phase difference detector may be combined to be a phase difference detector. Also, the first loop connection and the second loop connection may be combined to be a loop connection.

An ultrasonic thermometer or an ultrasonic pressure gage according to the present invention, which measures a temperature or a pressure of a fluid flowing through a conduit, comprises the following devices: an ultrasonic wave transmitter disposed in the conduit, an ultrasonic wave receiver disposed at a predetermined distance from the ultrasonic wave transmitter, a PLL circuit connected to the ultrasonic wave transmitter and the ultrasonic wave receiver, and a measurement controller for controlling to obtain an oscillating frequency of an oscillator and converting the oscillating frequency to a flow rate. The PLL circuit has a phase difference detector for detecting a phase difference between an ultrasonic wave transmitted from the ultrasonic wave transmitter and an ultrasonic wave received by the ultrasonic wave receiver, an integrating circuit for integrating an output waveform outputted from the phase difference detector, and said oscillator, which is controlled by an output signal outputted from the integrating circuit.

An ultrasonic thermometer or an ultrasonic pressure gage according to the present invention, which measures a temperature or a pressure of a fluid flowing through a conduit, comprises the following devices: an ultrasonic wave transmitter disposed in the conduit, a first ultrasonic wave receiver and a second ultrasonic wave receiver disposed at a predetermined distances from the ultrasonic wave transmitter in the opposite directions, a PLL circuit connected to the ultrasonic wave transmitter, a switching device connected to the PLL circuit, and a measurement controller for obtaining an oscillating frequency of an oscillator and converting the oscillating frequency to a flow rate. The switching device alternatively changes connection of the PLL circuit to be connected either to the first ultrasonic wave receiver or to the second ultrasonic wave receiver respectively. The PLL circuit has a phase differences detector for detecting a phase difference between an ultrasonic wave transmitted from the ultrasonic wave transmitter and an ultrasonic wave received by the first and second ultrasonic wave receivers, an integrating circuit for integrating an output waveform outputted from the phase difference detector and said oscillator, which is controlled by an output signal outputted from the integrating circuit.

An ultrasonic thermometer or an ultrasonic pressure gage according to the present invention, which measures a temperature or a pressure of a fluid flowing through a conduit, comprises the following devices: an ultrasonic wave generator for generating an ultrasonic wave, an ultrasonic wave transmitter disposed in the conduit, the transmitter transmitting an ultrasonic wave generated from the ultrasonic wave generator, an ultrasonic wave receiver dispose data predetermined distance from the ultrasonic wave transmitter, a phase difference detector for detecting a phase difference between an ultrasonic wave transmitted from the ultrasonic wave transmitter and an ultrasonic wave received by the ultrasonic wave receiver, an integrating circuit for integrating an output waveform outputted from the phase difference detector, an oscillator controlled by an output signal outputted from the integrating circuit, and a measurement controller for obtaining an oscillating frequency of the oscillator and converting the oscillating frequency to a temperature or pressure.

An ultrasonic thermometer or an ultrasonic pressure gage according to the present invention, which measures a temperature or a pressure of a fluid flowing through a conduit, comprises the following devices: a first ultrasonic wave transmission and reception device disposed in the conduit, a second ultrasonic wave transmission and reception device disposed at a predetermined distance from the first ultrasonic wave transmission and reception device, a switching device connected to the first and second ultrasonic wave transmission and reception devices, a PLL circuit connected to the switching device, and a measurement controller for obtaining an oscillating frequency of an oscillator and converting the oscillating frequency to a temperature or a pressure. The switching device alternatively changes connection of the PLL circuit such that the input thereof is connected to the first ultrasonic wave transmission and reception device and also the output thereof is connected to the second ultrasonic wave transmission and reception device, or such that the input thereof is connected to the second ultrasonic wave transmission and reception device and also the output thereof is connected to the first ultrasonic wave transmission and reception device. And, the PLL circuit has a phase difference detector for detecting a phase difference between an ultrasonic wave transmitted from the first or the second ultrasonic wave transmission and reception device and an ultrasonic wave received by the second or the first ultrasonic wave transmission and reception device, an integrating circuit for integrating an output waveform outputted from the phase difference detector, and an oscillator controlled by an output signal outputted from the integrating circuit.

An ultrasonic thermometer or an pressure gage according to the present invention, which measures a temperature or a pressure of a fluid flowing through a conduit, comprises the following devices: an ultrasonic wave generator for generating ultrasonic wave, a first ultrasonic wave transmission and reception device disposed in the conduit, a second ultrasonic wave transmission and reception device disposed in the conduit at a predetermined distance from the first ultrasonic wave transmission and reception device, the devices transmitting and receiving an ultrasonic wave generated from the ultrasonic generator, a switching device connected to the first and second ultrasonic wave transmission and reception devices, a phase difference detector connected to the switching device, the detector detecting a phase difference between an ultrasonic wave transmitted from the first or the second ultrasonic wave transmission and reception device and an ultrasonic wave received by the second or the first ultrasonic wave transmission and reception device, an integrating circuit for integrating an output wave form outputted from the phase difference detector, an oscillator controlled by an output signal outputted from the integrating circuit, and a measurement controller for obtaining an oscillating frequency of the oscillator and converting the oscillating frequency to a temperature or a pressure. The switching device alternatively changes connection of the input of the phase difference detector to be connected either to the first ultrasonic wave transmission and reception device, or to the second ultrasonic wave transmission and reception device.

DETAILED DESCRIPTION OF THE INVENTION

Figure 1:
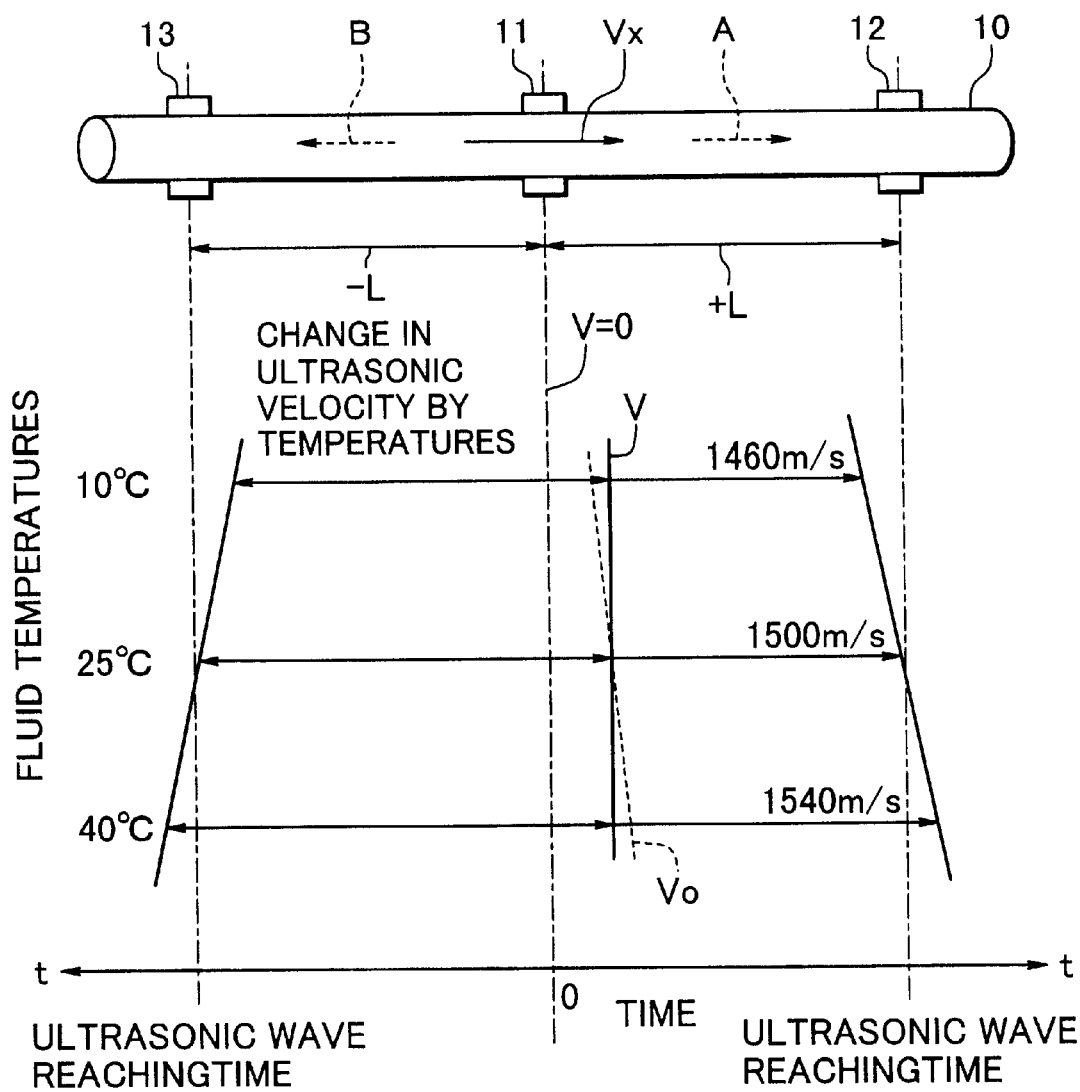
FIG. 1 is a schematic drawing showing a flow rate, a temperature or a pressure measurement method according to the first embodiment of the present invention.

Referring to the drawings, specific examples of the present invention will be explained.

FIG. 1 is a schematic drawing showing a flow rate measurement method according to the first embodiment of the present invention.

In a conduit 10 for flowing a fluid therethrough, a generator 11 for generating an ultrasonic wave and receivers 12, 13 for receiving an ultrasonic wave generated from the vibrator 11 are disposed. The receiver 12 is positioned at the distance +L from the vibrator 11 to one direction along the conduit 10, while the receiver 13 is positioned at the distance −L from the vibrator 11 to the opposite direction along the conduit 10.

With a flow velocity V of a fluid (for example, water) of 0 m/s, an ultrasonic wave having a predetermined frequency is transmitted from the vibrator 11 and the transmitted ultrasonic wave is received by the receivers 12 and 13. When a flow velocity V of the fluid in the conduit 10 is zero, the time in which the ultrasonic wave transmitted from the vibrator 11 reaches to the receivers 12 and 13 respectively is constant regardless of a temperature of the fluid. However, an absolute time is dependent on a temperature of the fluid. And, in the case that the fluid is water, the higher is the temperature of the fluid, the faster is the ultrasonic velocity, as shown in FIG. 1.

When a flow velocity V of the fluid flowing through the conduit 10 will be measured, ultrasonic velocities A and B in the conduit are obtained respectively and then an average thereof is calculated according to the mentioned-below formula (1). Consequently, the flow velocity V is canceled, whereby an absolute ultrasonic velocity S at a present temperature and a pressure of the fluid in the conduit can be obtained. Here, the ultrasonic velocity A is a reference ultrasonic velocity as an ultrasonic wave is transmitted toward the receiver 12, and the ultrasonic velocity B is a reference ultrasonic velocity as an ultrasonic wave is transmitted toward the receiver 13.

On the other hand, a difference between the ultrasonic velocity A and the ultrasonic velocity B is divided by 2, as shown in the mentioned-below formula (2). Consequently, the ultrasonic velocity is canceled, whereby a temporary flow velocity $V_0$ (the velocity before correction) at the present temperature and the pressure of the fluid in the conduit can be obtained.

$$S=(A+B)/2 \qquad (1)$$

$$V_0=(A-B)/2 \qquad (2)$$

The absolute ultrasonic velocity S obtained from the formula (1) may be different from an actual ultrasonic velocity due to a temperature or a pressure of the fluid. Similarly, the temporary flow velocity $V_0$ obtained from the formula (2) may be different from an actual velocity due to a temperature or a pressure of the fluid. Accordingly, in order to obtain the actual flow velocity, it is necessary to correct the difference caused by a temperature or a pressure of the fluid. Next, the correction method will be explained.

In the case that the fluid is water, temperatures of the fluid varies a ultrasonic velocity to 1500 m/s at 25° C., 1460 m/s at 10° C. and 1540 m/s at 40° C., as shown in FIG. 1. When the reference ultrasonic velocity is 1500 m/s and the absolute ultrasonic velocity in the fluid is 1540 m/s, which is obtained from the formula (1), it is necessary to correct the temporary flow velocity $V_0$ obtained from the formula (2) with 40 m/s.

That is, the obtained temporary flow velocity $V_0$ requires correction by the difference of 40 m/s for the absolute ultrasonic velocity of 1540 m/s.

For one of correction methods, a reference ultrasonic velocity (for example, 1500 m/s when the fluid is water) in the fluid flowing through the conduit 10 is obtained firstly. And, the temporary flow velocity $V_0$ obtained by the formula (2) will be corrected by the above-mentioned method, in which such the reference ultrasonic velocity and the absolute ultrasonic velocity obtained by the formula (1) are used. And then, from the corrected flow velocity V (the flow velocity after correction) and a cross section area of the conduit 10, a flow rate of the fluid can be obtained accurately.

In the flow rate measurement method according to the first embodiment of the present invention, the absolute ultrasonic velocity S, variable by a temperature or a pressure of the fluid in the conduit 10, is obtained by using a transmission and a reception of an ultrasonic wave. Accordingly, it is able to correct the temporary flow velocity $V_0$ by without measurement of a temperature and a pressure of the fluid. So, the actual flow velocity of the fluid can be obtained accurately.

The measurement method according to the present invention will be capable of a measurement of a temperature or a pressure of a fluid. Next, a measurement method for measuring a temperature or a pressure will be explained.

A reference ultrasonic velocity (for example, 1500 m/s at 25° C. when the fluid is water, as described before) in the fluid flowing through the conduit 10 is obtained firstly. By such the reference ultrasonic velocity and the absolute ultrasonic velocity obtained by the formula (1), a relationship between a temperature and a pressure is obtained, by which a conversion table is made. For example, the conversion table shows a relationship to the absolute ultrasonic velocity, the reference ultrasonic velocity, a temperature and a pressure. So, by using such the conversion table, a pressure of the fluid can be determined as long as a temperature of the fluid is previously known, while a temperature of the fluid can be determined as long as a pressure of the fluid is previously known.

Figure 2:
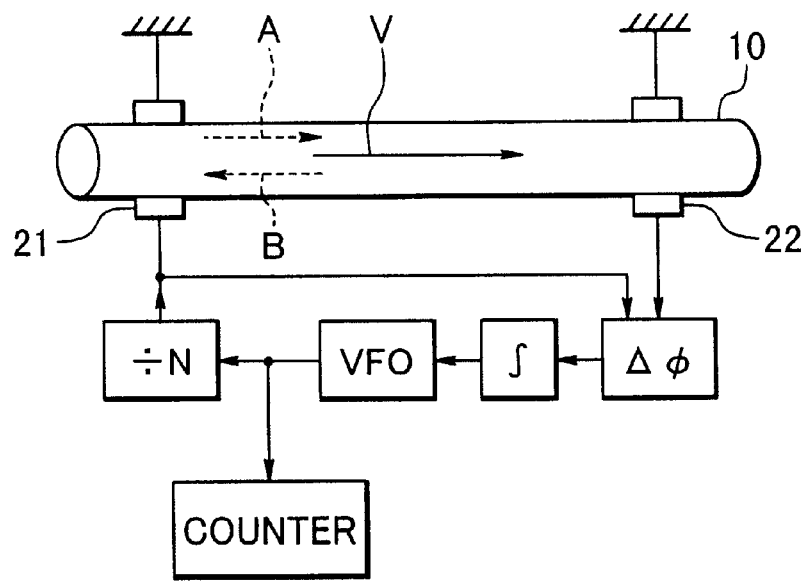
FIG. 2 is a diagram showing an ultrasonic flow meter, an ultrasonic thermometer or an ultrasonic pressure gage using the flow rate measurement method as shown in FIG. 1.

FIG. 2 is a diagram showing an ultrasonic flow meter using the flow rate measurement method as shown in FIG. 1.

The ultrasonic flow meter is provided with an ultrasonic wave transmitter 21 and an ultrasonic wave receiver 22 which are mounted to the outside of a conduit 10 for flowing a fluid therethrough. The ultrasonic wave transmitter 21 and the ultrasonic wave receiver 22 are spaced in a predetermined distance from each other. The ultrasonic wave receiver 22 is connected to a phase difference detector $\Delta\phi$. The phase difference detector $\Delta\phi$ is connected to an integrating circuit (low-pass filter) which integrates an output waveform outputted from the phase difference detector. The integrating circuit $\int$ is connected to an oscillator VFO which is controlled by an output signal outputted by the integrating circuit. The VFO is connected to an amplifier N and a counter. The counter displays frequency with four digits. The phase difference detector, the integrating circuit and the oscillator VFO construct a PLL (phase-locked loop) circuit. The amplifier N is connected to the ultrasonic wave transmitter 21 and the phase difference detector $\Delta\phi$.

A loop connection, which is constructed of the phase difference detector $\Delta\phi$, the integrating circuit $\int$, the oscillator VFO and the amplifier N, makes the phase difference detected by the phase difference detector (that is, a difference between a phase of an ultrasonic wave transmitted from the ultrasonic wave transmitter 21 and a phase of an ultrasonic wave received by the ultrasonic wave receiver 22) to be zero by using a PLL method. That is, when the phase difference in the fluid flowing through the conduit 10 at a flow velocity V is detected by the phase difference detector $\Delta\phi$, the loop connection continues to change an oscillating frequency until the phase difference detected by the phase difference detector becomes zero. And, an oscillating frequency is determined when the phase difference becomes zero. From the determined oscillating frequency or the wavelength, the ultrasonic velocity A in the fluid can be obtained.

Next, A loop connection is constructed, in which the ultrasonic wave transmitter 21, the ultrasonic wave receiver 22, the phase difference detector $\Delta\phi$, the integrating circuit $\int$, the oscillator VFO and the amplifier N, are reversely arranged to the arrangement as shown in FIG. 2. That is, both of the ultrasonic wave transmitter 21 and the ultrasonic wave receiver 22 may be changed to an ultrasonic wave transmission and reception device, instantly capable of switching a transmission and a reception. In addition, the loop connection may be made to be capable of switching as well.

Then, the ultrasonic velocity B is obtained, in the same manner as the above-mentioned method, by using the ultrasonic wave transmitter, the ultrasonic wave receiver and the like, which are reversely arranged.

Next, an average of the ultrasonic velocity A and the ultrasonic velocity B is calculated to obtain an absolute ultrasonic velocity in the fluid. Then, a difference between the ultrasonic velocity A and the ultrasonic velocity B is divided by 2 to obtain a temporary flow velocity $V_0$ of the fluid. However, since the temporary flow velocity $V_0$ is slightly different from an actual flow velocity, it will be corrected as follows.

A reference ultrasonic velocity is prepared such that the fluid is in a standard condition. The measurement controller, which is provided at the ultrasonic flow rate meter, will correct the temporary flow velocity $V_0$ by the difference between the reference ultrasonic velocity and the absolute ultrasonic velocity thereby to obtain an accurate flow velocity V of the fluid, and determine a flow rate of fluid by the accurate flow velocity V and a cross section area of the conduit 10.

According to the ultrasonic flow meter, the accurate flow velocity of the fluid can be obtained by using the phase wave transmitter, the ultrasonic wave receiver and the like, which are reversely arranged.

Next, an average of the ultrasonic velocity A and the ultrasonic velocity B is calculated to obtain an absolute ultrasonic velocity in the fluid. Then, a difference between the ultrasonic velocity A and the ultrasonic velocity B is divided by 2 to obtain a temporary flow velocity $V_0$ of the fluid. However, since the temporary flow velocity $V_0$ is slightly different from an actual flow velocity, it will be corrected as follows.

A reference ultrasonic velocity is prepared such that the fluid is in a standard condition. The measurement controller, which is provided at the ultrasonic flow rate meter, will correct the temporary flow velocity $V_0$ by the difference between the reference ultrasonic velocity and the absolute ultrasonic velocity thereby to obtain an accurate flow velocity V of the fluid, and determine a flow rate of fluid by the accurate flow velocity V and a cross section area of the conduit 10.

According to the ultrasonic flow meter, the accurate flow velocity of the fluid can be obtained by using the phase difference without correction by the measured temperature and pressure of the fluid.

Next, the embodiment of an ultrasonic thermometer or an ultrasonic pressure gage utilizing the measurement method for measurement of a temperature or a pressure of a fluid will be explained as shown in FIG. 2.

The ultrasonic thermometer or the ultrasonic pressure gage is provided with an ultrasonic wave transmitter 21 and an ultrasonic wave receiver 22 which are mounted to the outside of a conduit 10 for flowing a fluid therethrough. The ultrasonic wave transmitter 21 and the ultrasonic wave receiver 22 are spaced in a predetermined distance from each other. The ultrasonic wave receiver 22 is connected to a phase difference detector $\Delta\phi$. The phase difference detector A is connected to an integrating circuit $\int$ (low-pass filter) which integrates an output waveform outputted from the phase difference detector. The integrating circuit $\int$ is connected to an oscillator VFO which is controlled by an output signal outputted by the integrating circuit. The VFO is connected to an amplifier N and a counter. The counter displays frequency with four digits. The phase difference detector, the integrating circuit and the oscillator VFO construct a PLL(phase-locked loop) circuit. The amplifier N is connected to the ultrasonic wave transmitter 21 and the phase difference detector $\Delta\phi$.

A loop connection, which is constructed of the phase difference detector $\Delta\phi$, the integrating circuit $\int$, the oscillator VFO and the amplifier N, makes the phase difference detected by the phase difference detector (that is, the difference between a phase of an ultrasonic wave transmitted from the ultrasonic wave transmitter 21 and a phase of an ultrasonic wave received by the ultrasonic wave receiver 22) to be zero by using a PLL method. That is, when a phase difference in the fluid flowing through the conduit 10 at a flow velocity V is detected by the phase difference detector $\Delta\phi$, the loop connection continues to change an oscillating frequency until the phase difference detected by the phase difference detector becomes zero. And, an oscillating frequency is determined when the phase difference becomes zero. From the determined oscillating frequency or the wavelength, the ultrasonic velocity A in the fluid can be obtained.

Next, A loop connection is constructed, in which the ultrasonic wave transmitter 21, the ultrasonic wave receiver 22, the phase difference detector $\Delta\phi$, the integrating circuit $\int$, the oscillator VFO and the amplifier N, are reversely arranged to the arrangement as shown in FIG. 2. That is, both of the ultrasonic wave transmitter 21 and the ultrasonic wave receiver 22 may be changed to an ultrasonic wave transmission and reception device, instantly capable of switching the transmission and the reception. In addition, the loop connections may be made to be capable of switching as well.

Then, the ultrasonic velocity B is obtained, in the same manner as the above-mentioned method, by using the ultrasonic wave transmitter, the ultrasonic wave receiver and the like in the loop connection, which are reversely arranged.

Next, an average of the ultrasonic velocity A and the ultrasonic velocity B is calculated to obtain an absolute ultrasonic velocity in the fluid.

A reference ultrasonic velocity is prepared such that the fluid is in a standard condition. The measurement controller, which is provided at the ultrasonic thermometer and the ultrasonic pressure gage, will determine a temperature or a pressure of the fluid by the difference between such the reference ultrasonic velocity and the absolute ultrasonic velocity.

Figure 3:
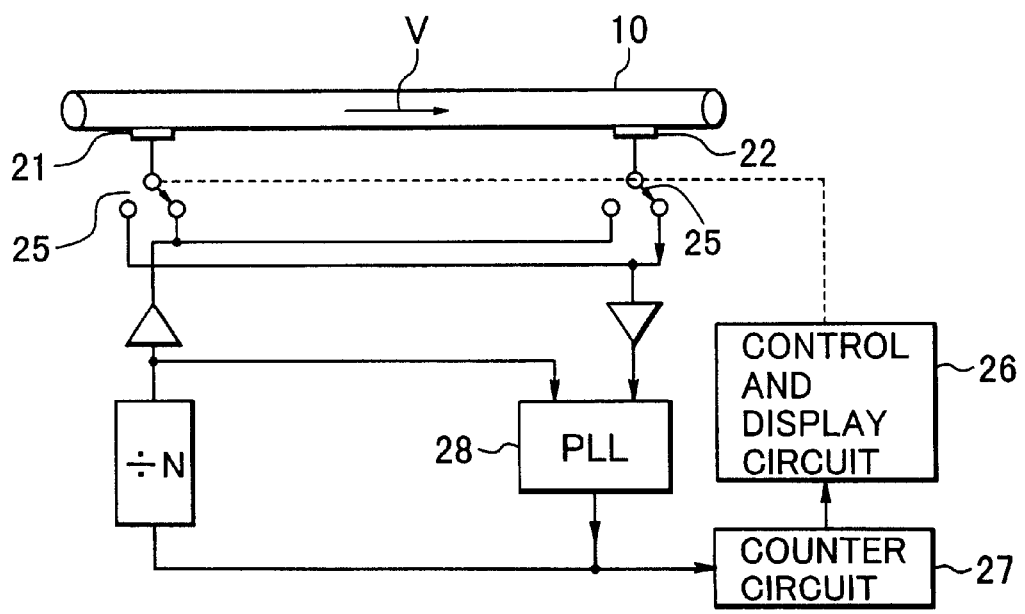
FIG. 3 is a diagram showing an ultrasonic flow rate meter, an ultrasonic thermometer or an ultrasonic pressure gage according to the second embodiment of the present invention.

FIG. 3 is a diagram showing an ultrasonic flow rate meter according to the second embodiment of the present invention. The same parts as those in FIG. 2 have the same marks as in FIG. 2. Only different parts will be explained here.

The ultrasonic flow rate meter is provided with a first ultrasonic wave transmission and reception device 21 and a second ultrasonic wave transmission and reception device 22 having an ultrasonic wave oscillator (OSC) respectively. The first and second ultrasonic wave transmission and reception devices 21 and 22 are spaced in a predetermined distance from each other. The first and second ultrasonic wave transmission and reception devices 21 and 22 are connected to a switching device 25, which is connected to a PLL circuit 28 and an amplifier N. The PLL circuit 28 is constructed of a phase difference detector, an integrating circuit and an oscillator.

The first and the second ultrasonic wave transmission and reception devices 21 and 22 are connected to a control and display circuit 26, which is connected to a counter circuit 27. The counter circuit 27, which counts a frequency oscillated from the oscillator, is connected to a PLL circuit 28. The control and display circuit 26 converts the counted oscillating frequency to a flow rate and displays it.

Next, a method for measurement of a flow rate of a fluid flowing through the conduit 10, which utilizes the ultrasonic flow rate meter, will be explained.

Firstly, an ultrasonic wave having a predetermined frequency is transmitted from the first ultrasonic wave transmission and reception device 21, and the transmitted ultrasonic wave is received by the second ultrasonic wave transmission and reception device 22. At this time, a phase difference between the transmitted ultrasonic wave and the received ultrasonic wave is detected by the phase difference detector, and a detected output waveform is integrated by the integrating circuit. Based on the output signal outputted from the integrating circuit, the oscillator is so controlled as to change an oscillating frequency. Next, an ultrasonic wave having the changed oscillating frequency is received by the second ultrasonic wave transmission and reception device 22. At this time, a phase difference between the transmitted ultrasonic wave and the received ultrasonic wave is detected by the phase difference detector, and a detected output waveform is integrated by the integrating circuit. Based on the output signal outputted from the integral circuit, the oscillator is so controlled as to change an oscillating frequency.

Such as the PLL method makes the phase difference to come to be zero, and an oscillating frequency is determined when the phase difference becomes zero. The determined oscillating frequency is counted by the counter circuit 27 and the counted oscillating frequency is converted to a flow rate by the control circuit thereby the ultrasonic velocity A in the fluid being obtained.

Next, the switching device 25 switches the connection reversely. Then, in the same manner as the above-mentioned method, an ultrasonic wave having a predetermined frequency is transmitted from the second ultrasonic wave transmission and reception device 22, and the transmitted ultrasonic wave is received by the first ultrasonic wave transmission and reception device 21. At this time, a phase difference between the transmitted ultrasonic wave and the received ultrasonic wave is detected by the phase difference detector, and a detected output waveform is integrated by the integrating circuit. Based on the output signal outputted from the integral circuit, the oscillator is so controlled as to change an oscillating frequency. Next, an ultrasonic wave having the changed oscillating frequency is received by the first ultrasonic wave transmission and reception device 21. At this time, a phase difference between the transmitted ultrasonic wave and the received ultrasonic wave is detected by the phase difference detector, and a detected output waveform is integrated by the integrating circuit. Based on the output signal outputted from the integral circuit, the oscillator is so controlled as to change an oscillating frequency.

Such as the PLL method makes the phase difference to come to be zero, and an oscillating frequency is determined when the phase difference becomes zero. The determined oscillating frequency is counted by the counter circuit 27 and the counted oscillating frequency is converted to a flow rate by the control circuit thereby the ultrasonic velocity B in the fluid being obtained.

Next, an average of the ultrasonic velocity A and the ultrasonic velocity B is calculated by the control circuit to obtain an absolute ultrasonic velocity in the fluid. Further, a difference between the ultrasonic velocity A and the ultrasonic velocity B is divided by two to obtain a temporary flow velocity $V_0$ of the fluid. Since the obtained temporary flow velocity $V_0$ is different from an actual flow velocity, the difference is corrected by the control circuit as the same manner as the first embodiment, and an actual flow velocity which corrected the flow velocity is displayed at the display circuit.

According to the second embodiment, the same effect as the first embodiment can be obtained.

Next, an embodiment of an ultrasonic thermometer or an ultrasonic pressure gage according to the present invention will be explained as shown in FIG. 3. The same parts as those of the first embodiment will be not explained here.

The ultrasonic thermometer or the ultrasonic pressure gage is provided with a first ultrasonic wave transmission and reception device 21 and a second ultrasonic wave transmission and reception device 22 having an ultrasonic wave oscillator (OSC) respectively. The first and the second ultrasonic wave transmission and reception devices 21 and 22 are spaced in a predetermined distance from each other. The first and the second ultrasonic wave transmission and reception devices 21 and 22 are connected to a switching device 25, which is connected to a PLL circuit 28 and an amplifier N. The PLL circuit 28 is constructed of the phase difference detector, the integrating circuit and the oscillator.

The first and the second ultrasonic wave transmission and reception devices 21 and 22 are connected to a control and display circuit 26, which is connected to a counter circuit 27. The counter circuit 27, which counts an oscillating frequency of the oscillator, is connected to a PLL circuit 28. The control and display circuit 26 converts the counted oscillating frequency to a temperature or a pressure and displays it.

Next, a measurement method for measurement of a temperature or a pressure of a fluid flowing through the conduit 10, which utilizes the ultrasonic thermometer or the ultrasonic pressure gage, will be explained.

Firstly, an ultrasonic wave having a predetermined frequency is transmitted from the first ultrasonic wave transmission and reception device 21, and the transmitted ultrasonic wave is received by the second ultrasonic wave transmission and reception device 22. At this time, a phase difference between the transmitted ultrasonic wave and the received ultrasonic wave is detected by the phase difference detector, and a detected output waveform is integrated by the integrating circuit. Based on the output signal outputted from the integrating circuit, the oscillator is so controlled as to change an oscillating frequency. Next, an ultrasonic wave having the changed oscillating frequency is received by the second ultrasonic wave transmission and reception device 22. At this time, a phase difference between the transmitted ultrasonic wave and the received ultrasonic wave is detected by the phase difference detector, and a detected output waveform is integrated by the integrating circuit. Based on the output signal outputted from the integral circuit, the oscillator is so controlled as to change an oscillating frequency.

Such as the PLL method makes the phase difference to come to be zero, and an oscillating frequency is determined when the phase difference becomes zero. The determined oscillating frequency is counted by the counter circuit 27 and the counted oscillating frequency is converted to a flow rate by the control circuit thereby the ultrasonic velocity A in the fluid being obtained.

Next, the switching device 25 switches the connection reversely. Then, in the same manner as the above-mentioned method, an ultrasonic wave having a predetermined frequency is transmitted from the second ultrasonic wave transmission and reception device 22, and the transmitted ultrasonic wave is received by the first ultrasonic wave transmission and reception device 21. At this time, a phase difference between the transmitted ultrasonic wave and the received ultrasonic wave is detected by the phase difference detector, and a detected output waveform is integrated by the integrating circuit. Based on the output signal outputted from the integral circuit, the oscillator is so controlled as to change an oscillating frequency. Next, an ultrasonic wave having the changed oscillating frequency is received by the first ultrasonic wave transmission and reception device 21. At this time, a phase difference between the transmitted ultrasonic wave and the received ultrasonic wave is detected by the phase difference detector, and a detected output waveform is integrated by the integrating circuit. Based on the output signal outputted from the integral circuit, the oscillator is so controlled as to change an oscillating frequency.

Such as the PLL method makes the phase difference to come to be zero, and an oscillating frequency is determined when the phase difference becomes zero. The determined oscillating frequency is counted by the counter circuit 27 and the counted oscillating frequency is converted to a flow rate by the control circuit thereby the ultrasonic velocity B in the fluid being obtained.

Next, an average of the ultrasonic velocity A and the ultrasonic velocity B is calculated by the control circuit to obtain an absolute ultrasonic velocity in the fluid.

A reference ultrasonic velocity is prepared such that the fluid is in a standard condition. By utilizing a difference between the reference ultrasonic velocity and the absolute ultrasonic velocity, a temperature or a pressure of the fluid can be obtained accurately.

Figure 4:
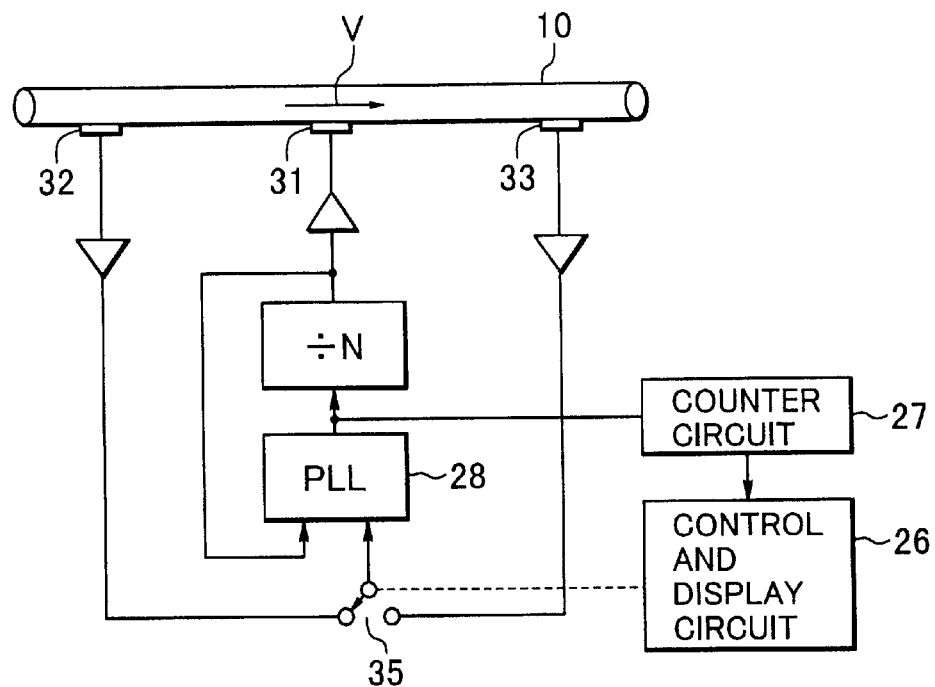
FIG. 4 is a diagram showing an ultrasonic flow meter, an ultrasonic thermometer or an ultrasonic pressure gage according to the third embodiment of the present invention.

FIG. 4 is a diagram showing an ultrasonic flow rate meter according to the third embodiment of the present invention.

The same parts as those in FIG. 4 have the same marks as in FIG. 3. Only different parts will be explained here.

The ultrasonic flow meter is provided with an ultrasonic wave transmitter 31 having an ultrasonic wave oscillator (OSC), and a first ultrasonic wave receiver 32 and a second ultrasonic wave receiver 33 which are disposed for a predetermined distances from the ultrasonic wave transmitter 31 to the opposite directions. The first ultrasonic wave receiver 32 and the second ultrasonic wave receiver 33 are connected to a switching device 35, which is connected to a PLL circuit 28 and a amplifier N.

The first and the second ultrasonic wave receivers 32 and 33 are connected to a control and display circuit 26, which is connected to a counter circuit 27.

Next, a measurement method for measurement of flow rate of a fluid flowing through a conduit, which utilizes the ultrasonic flow rate meter, will be explained.

Firstly, an ultrasonic wave having a predetermined frequency is transmitted from the ultrasonic wave transmitter 31 and the transmitted ultrasonic wave is received by the first ultrasonic wave receiver 32. The PLL circuit makes the phase difference in the ultrasonic wave at the transmission and the reception to come to be zero, and an oscillating frequency is determined when the phase difference becomes zero. The oscillating frequency is counted by the counter circuit 27 and the counted oscillating frequency is converted to a flow rate by the control circuit thereby the ultrasonic velocity A in the fluid being obtained.

Next, the switching device 35 switches the connection reversely. In the same manner as the above-mentioned method, an ultrasonic wave having a predetermined frequency is transmitted from the ultrasonic wave transmitter 31 and the transmitted ultrasonic wave is received by the second ultrasonic wave receiver 33. The PLL method makes the phase difference in the ultrasonic wave at the transmission and the reception to come to be zero, and an oscillating frequency is determined when the phase difference becomes zero. The oscillating frequency is counted by the counter circuit 27 and the counted oscillating frequency is converted to a flow rate by the control circuit thereby the ultrasonic velocity B in the fluid being obtained.

Next, a temporary flow velocity $V_0$ is obtained by the same manner as the second embodiment, and an actual flow velocity V which corrected the temporary flow velocity $V_0$ is displayed at the display circuit.

According to the third embodiment, the same effect as the first embodiment can be obtained.

Next, an embodiment of an ultrasonic thermometer or an ultrasonic pressure gage according to the present invention will be explained as shown in FIG. 3. The same parts as those of the second embodiment will be not explained here.

The ultrasonic thermometer or the ultrasonic pressure gage is provided with an ultrasonic wave transmitter 31 having an ultrasonic wave oscillator(OSC), and a first ultrasonic wave receiver 32 and a second ultrasonic wave receiver 33 which are disposed for a predetermined distances from the ultrasonic wave transmitter 31 to the opposite directions. The first and the second ultrasonic wave receivers 32 and 33 are connected to a switching device 35, which is connected to a PLL circuit 28 and an amplifier N.

The first and the second ultrasonic wave receivers 32 and 33 are connected to a control and display circuit 26, which is connected to a counter circuit 27.

Next, a measurement method for measurement of a temperature or a pressure of a fluid flowing through a conduit, which utilizes the ultrasonic thermometer or the ultrasonic pressure gage, will be explained.

Firstly, an ultrasonic wave having a predetermined frequency is transmitted from the ultrasonic wave transmitter 31 and the transmitted ultrasonic wave is received by the first ultrasonic wave receiver 32. The PLL circuit makes the phase difference in the ultrasonic wave at the transmission and the reception to come to be zero, and an oscillating frequency is determined when the phase difference becomes zero. The oscillating frequency is counted by the counter circuit 27 and the counted oscillating frequency is converted to a flow rate by the control circuit thereby the ultrasonic velocity A in the fluid being obtained.

Next, the switching device 35 switches the connection reversely. In the same manner as the above-mentioned method, an ultrasonic wave having a predetermined frequency is transmitted from the ultrasonic wave transmitter 31 and the transmitted ultrasonic wave is received by the second ultrasonic wave receiver 33. The PLL method makes the phase difference in the ultrasonic wave at the transmission and the reception to come to be zero, and an oscillating frequency is determined when the phase difference becomes zero. The oscillating frequency is counted by the counter circuit 27 and the counted oscillating frequency is converted to a flow rate by the control circuit thereby an ultrasonic velocity B in the fluid being obtained.

Next, a temporary flow velocity is obtained and corrected by the same manner as the second embodiment. Then, a temperature or a pressure is displayed at the display circuit.

According to the embodiment, the same effect as the first embodiment can be obtained.

Figure 5:
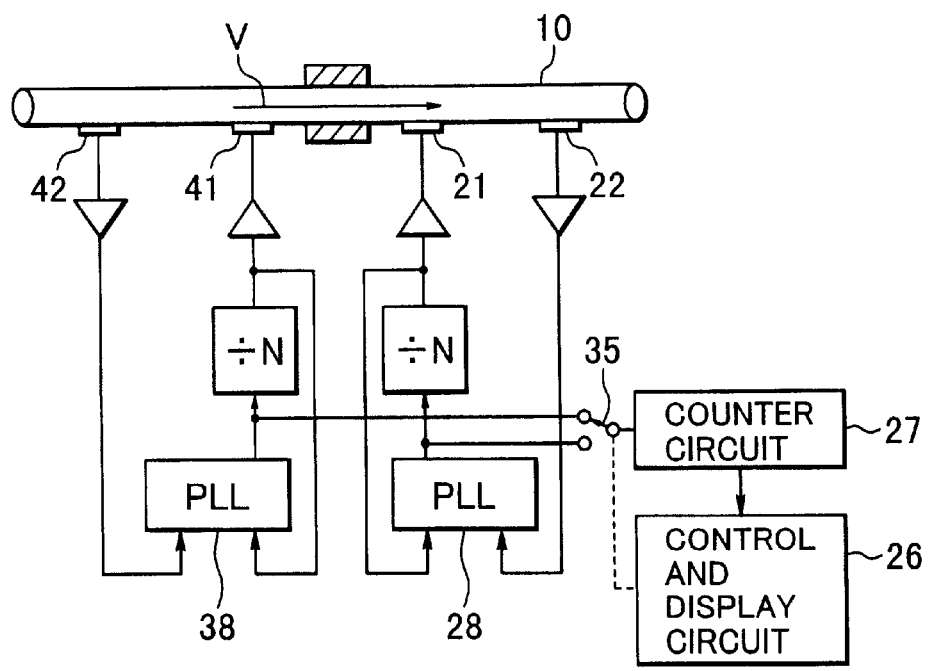
FIG. 5 is a diagram showing an ultrasonic flow meter according to the fourth embodiment of the present invention.

FIG. 5 is a diagram showing an ultrasonic flow rate meter according to the fourth embodiment of the present invention. The same parts as those in FIG. 5 have the same marks as in FIG. 3. Only different parts will be explained here.

The ultrasonic flow meter is provided with an ultrasonic wave transmitter 21 having an ultrasonic wave oscillator (OSC) and an ultrasonic wave receiver 22, which are spaced in a predetermined distance from each other. The ultrasonic wave receiver 22 is connected to a PLL circuit 28, which is connected to a switching device 35 and an amplifier N. The amplifier N is connected to the ultrasonic wave transmitter 21, and a switching circuit 35 is connected to a counting circuit 27 and a control and display circuit 26.

The ultrasonic flow meter is also provided with an ultrasonic wave transmitter 41 having an ultrasonic wave oscillator(OSC) and an ultrasonic wave receiver 42, which are spaced in a predetermined distance from each other. The ultrasonic wave receiver 42 is connected to a PLL circuit 38, which is connected to the switching device 35 and an amplifier N. The amplifier N is connected to the ultrasonic wave transmitter 41.

Next, the flow rate measurement method for measurement of a fluid flowing through a conduit, which utilizes the ultrasonic flow rate meter, will be explained.

Firstly, an ultrasonic wave having a predetermined frequency is transmitted from the ultrasonic wave transmitter 21 and the transmitted ultrasonic wave is received by the ultrasonic wave receiver 22. The PLL circuit 28 makes the phase difference in the ultrasonic wave at the transmission and the reception to come to be zero, and an oscillating frequency is determined when the phase difference becomes zero. The oscillating frequency is counted by the counter circuit 27 and the counted oscillating frequency is converted to a flow rate by the control circuit thereby an ultrasonic velocity A in the fluid being obtained.

Next, the switching device 35 switches the connection reversely. In the same manner as the above-mentioned method, an ultrasonic wave having a predetermined frequency is transmitted from the ultrasonic wave transmitter 41 and the transmitted ultrasonic wave is received by the ultrasonic wave receiver 42. The PLL circuit 38 makes the phase difference in the ultrasonic wave at the transmission and the reception to come to be zero, and an oscillating frequency is determined when the phase difference becomes zero. The oscillating frequency is counted by the counter circuit 27 and the counted oscillating frequency is converted to a flow rate by the control circuit thereby an ultrasonic velocity B in the fluid being obtained.

Next, a temporary flow velocity $V_0$ is obtained and corrected by the same manner as the second embodiment, and the corrected flow velocity is displayed at the display circuit.

According to the fourth embodiment, the same effect as the first embodiment can be obtained.

The present invention should not be limited to the above-mentioned embodiments and various modifications may be made by to those skilled in the art without departing from the scope of the claims.

According to the embodiment, the present invention is applied to the flow rate measurement method and the ultrasonic flow rate meter. Here, if the fluid velocity is 0 m/s and the fluid pressure is previously known, it is possible to apply the present invention to an ultrasonic thermometer which measures the temperature of the fluid. Also, if the fluid velocity is 0 m/s and the fluid temperature is previously known, it is possible to apply the present invention to an ultrasonic pressure gage which measures the pressure of the fluid.

In those embodiments, the present invention is applied to a temperature or a pressure measurement method, a thermometer and a pressure gage. Also, the invention makes it possible to be applied such that both of a flow rate and a temperature or a pressure can be measured at the same time. And, the invention can be applied as a thermometer as long as a pressure of a fluid is previously known, or as a pressure gage as long as a temperature of a fluid is previously known.

EFFECT OF THE INVENTION

As mentioned above, according to the present invention, a flow rate measurement method, a flow velocity measurement method and an ultrasonic flow rate meter, which can measure a fluid velocity accurately by using a phase difference, will be provided.

Further, according to the present invention, a temperature or a pressure measurement method, an ultrasonic thermometer or an ultrasonic pressure gage, which can measure a temperature or a pressure of a fluid accurately by using a phase difference, will be provided.

What is claim is:

1. A flow rate measurement method, which measures a flow rate of a fluid flowing through a conduit, comprising:
   preparing a reference ultrasonic velocity such that the fluid is in a standard condition;
   measuring an ultrasonic velocity A by transmitting an ultrasonic wave from one side and receiving the ultrasonic wave at the other side in the fluid flowing through the conduit;
   measuring an ultrasonic velocity B by transmitting an ultrasonic wave from the other side and receiving the ultrasonic wave at the one side in the fluid flowing through the conduit;
   averaging the ultrasonic velocity A and the ultrasonic velocity B thereby to obtain an absolute ultrasonic velocity in the fluid;
   dividing a difference between the ultrasonic velocity A and the ultrasonic velocity B by 2 thereby to obtain a temporary flow velocity of the fluid;
   correcting the temporary flow velocity by using a difference between the reference ultrasonic velocity and the absolute ultrasonic velocity thereby to determine an accurate flow velocity of the fluid; and
   determining a flow rate of the fluid by using the accurate flow velocity and a cross section area of the conduit.

2. An ultrasonic flow rate meter, which measures a flow rate of a fluid flowing through a conduit, comprising:
   a first ultrasonic wave transmission and reception device disposed on the outside of the conduit;
   a second ultrasonic wave transmission and reception device disposed on the outside of the conduit part away from the first ultrasonic wave transmission and reception device;
   a first phase difference detector connected to the second ultrasonic wave transmission and reception device;
   a first PLL type loop connection disposed between the first phase difference detector and the first ultrasonic wave transmission and reception device, said first PLL type loop connection being operative iteratively to adjust an output frequency until a phase difference detected by said first phase difference detector becomes zero, whereby a first frequency is selected;
   a second phase difference detector connected to the first ultrasonic wave transmission and reception device;
   a second PLL type loop connection disposed between the second phase difference detector and the second ultrasonic wave transmission and reception device, said second PLL type loop connection being operative iteratively to adjust an output frequency until a phase difference detected by said second phase difference detector becomes zero, whereby a second frequency is selected; and
   a measurement controller for obtaining a flow rate of the fluid on the basis of said first frequency and said second frequency.

3. The ultrasonic flow rate meter according to claim 2, wherein the first ultrasonic wave transmission and reception device may be constructed of a first ultrasonic wave transmitter and a first ultrasonic wave receiver, the second ultrasonic wave transmission and reception device may be constructed of a second ultrasonic wave transmitter and a second ultrasonic wave receiver, the first phase difference detector and the second phase difference detector may be combined to be a phase difference detector and the first loop connection and the second loop connection may be combined to be a loop connection.

4. An ultrasonic flow rate meter, which measures a flow rate of a fluid flowing through a conduit, comprising:
   an ultrasonic wave transmitter disposed in the conduit;
   an ultrasonic wave receiver disposed at a predetermined distance from the ultrasonic wave transmitter;

a PLL circuit connected to the ultrasonic wave transmitter and the ultrasonic wave receiver, said PLL circuit being operative iteratively to adjust an output frequency of an oscillator until a detected phase difference becomes zero, whereby a first oscillating frequency is selected; and a measurement controller for obtaining said first oscillating frequency and converting the oscillating frequency to a flow rate;

wherein the PLL circuit has a phase difference detector for detecting a phase difference between an ultrasonic wave transmitted from the ultrasonic wave transmitter and an ultrasonic wave received by the ultrasonic wave receiver, an integrating circuit for integrating an output waveform outputted from the phase difference detector, and the oscillator, which is controlled by an output signal outputted from the integrating circuit.

5. An ultrasonic flow rate, which measures a flow rate of a fluid flowing through a conduit, comprising:

an ultrasonic wave transmitter disposed in the conduit;

a first ultrasonic wave receiver and a second ultrasonic wave receiver disposed at a predetermined distance from the ultrasonic wave transmitter in the opposite direction respectively;

a PLL circuit connected to the ultrasonic wave transmitter;

a switching device connected to the PLL circuit; and a measurement controller for obtaining an oscillating frequency of an oscillator and converting the oscillating frequency to a flow rate;

wherein the switching device alternatively changes connection of the PLL circuit to be connected either to the first ultrasonic wave receiver or to the second ultrasonic wave receiver, and the PLL circuit has a phase differences detector for detecting a phase difference between an ultrasonic wave transmitted from the ultrasonic wave transmitter and an ultrasonic wave received by the first or the second ultrasonic wave receiver respectively, an integrating circuit for integrating an output waveform outputted from the phase difference detector, and the oscillator, which is controlled by an output signal outputted from the integrating circuit.

6. An ultrasonic flow rate meter, which measures a flow rate of a fluid flowing through a conduit, comprising:

an ultrasonic wave generator for generating an ultrasonic wave;

an ultrasonic wave transmitter disposed in the conduit, the transmitter transmitting an ultrasonic wave generated from the ultrasonic wave generator;

an ultrasonic wave receiver disposed at a predetermined distance from the ultrasonic wave transmitter;

a phase difference detector for detecting a phase difference between an ultrasonic wave transmitted from the ultrasonic wave transmitter and an ultrasonic wave received by the ultrasonic wave receiver;

an integrating circuit for integrating an output waveform outputted from the phase difference detector;

an oscillator controlled by an output signal outputted from the integrating circuit, said oscillator having its output frequency adjusted until a detected phase difference becomes zero, whereby a first oscillating frequency is selected; and a measurement controller for obtaining said first oscillating frequency of the oscillator and converting the oscillating frequency to a flow rate.

7. An ultrasonic flow rate meter according to claim 4 comprising two sets of the ultrasonic flow rate meter.

8. An ultrasonic flow rate meter, which measures a flow rate of a fluid flowing through the conduit, comprising:

a first ultrasonic wave transmission and reception device disposed in the conduit;

a second ultrasonic wave transmission and reception device disposed at a predetermined distance from the first ultrasonic wave transmission and reception device;

a switching device connected to the first and second ultrasonic wave transmission and reception devices;

a PLL circuit connected to the switching device; and a measurement controller for obtaining a selected oscillating frequency of an oscillator and converting the oscillating frequency to a flow rate;

wherein the switching device alternatively changes connection of the PLL circuit such that the input thereof is connected to the first ultrasonic wave transmission and reception device and also the output thereof is connected to the second ultrasonic wave transmission reception device, or such that the input thereof is connected to the second ultrasonic wave transmission and reception device and also the output thereof is connected to the first ultrasonic wave transmission and reception device, and the PLL circuit has a phase difference detector for detecting a phase difference between an ultrasonic wave transmitted from the first or the second ultrasonic wave transmission and reception device and an ultrasonic wave received by the second or the first ultrasonic wave transmission and reception device, an integrating circuit for integrating an output waveform outputted from the phase difference detector and an oscillator controlled by an output signal outputted from the integrating circuit said oscillator having its output frequency adjusted until a detected phase difference becomes zero, whereby a selected oscillating frequency is identified.

9. An ultrasonic flow rate meter, which measures a flow rate of a fluid flowing through a conduit, comprising:

an ultrasonic wave generator for generating an ultrasonic wave;

a first ultrasonic wave transmission and reception device disposed in the conduit;

a second ultrasonic wave transmission and reception device disposed in the conduit at a predetermined distance from the first ultrasonic wave transmission and reception device;

the devices transmitting and receiving an ultrasonic wave generated from the ultrasonic generator;

a switching device connected to the first and second ultrasonic wave transmission and reception devices;

a phase difference detector connected to the switching device, the detector detecting a phase difference between an ultrasonic wave transmitted from the first or the second ultrasonic wave transmission and reception device and an ultrasonic wave received by the second or the first ultrasonic wave transmission and reception device respectively;

an integrating circuit for integrating an output waveform outputted from the phase difference detector;

an oscillator controlled by an output signal outputted from the integrating circuit; and a measurement controller for obtaining an oscillating frequency of the oscillator when said phase difference is zero, and converting the oscillating frequency to a flow rate;

wherein the switching device alternatively changes connection of the input of the phase difference detector to be connected either to the first ultrasonic wave transmission and reception device, or to the second ultrasonic wave transmission and reception device.

10. A flow velocity measurement method, which measures a flow velocity of a fluid flowing through a conduit, comprising:

preparing a reference ultrasonic velocity such that the fluid is in a standard condition;

measuring an ultrasonic velocity A by transmitting an ultrasonic wave from one side and receiving the ultrasonic wave at the other side in the fluid flowing through the conduit;

measuring an ultrasonic velocity B by transmitting an ultrasonic wave from the other side and receiving the ultrasonic wave at the one side in the fluid flowing through the conduit;

averaging the ultrasonic velocity A and the ultrasonic velocity B thereby to obtain an absolute ultrasonic velocity in the fluid;

dividing a difference between the ultrasonic velocity A and the ultrasonic velocity B by 2 thereby to obtain a temporary flow velocity of the fluid; and correcting the temporary flow velocity by using a difference between the reference ultrasonic velocity and the absolute ultrasonic velocity thereby to determine an accurate flow velocity of the fluid.

11. A measurement method, which measures a temperature or a pressure of a fluid flowing through a conduit, comprising:

preparing a reference ultrasonic velocity such that the fluid is in a standard condition, measuring an ultrasonic velocity A by transmitting an ultrasonic wave from one side and receiving the ultrasonic wave at the other side in the fluid flowing through the conduit;

measuring an ultrasonic velocity B by transmitting an ultrasonic wave from the other side and receiving the ultrasonic wave at the one side in the fluid flowing through the conduit;

averaging the ultrasonic velocity A and the ultrasonic velocity B thereby to obtain an absolute ultrasonic velocity in the fluid;

dividing a difference between the ultrasonic velocity A and the ultrasonic velocity B by 2 thereby to obtain a temporary flow velocity of the fluid;

correcting the temporary flow velocity by using a difference between the reference ultrasonic velocity and the absolute ultrasonic velocity thereby to determine an accurate flow velocity of the fluid;

multiplying the accurate flow velocity by a cross section area of the conduit thereby to obtain a flow rate, at the same time obtaining a relationship between a temperature and a pressure by the reference ultrasonic velocity and the absolute ultrasonic velocity; and obtaining a pressure or a temperature of the fluid by the relationship and a predetermined temperature or a predetermined pressure of the fluid.

12. A measurement method, which measures a temperature or a pressure of a fluid flowing through a conduit, comprising:

preparing a reference ultrasonic velocity such that the fluid is in a standard condition;

measuring ultrasonic velocity A by transmitting an ultrasonic wave from one side and receiving the ultrasonic wave at the other side in the fluid flowing through the conduit;

measuring ultrasonic velocity B by transmitting an ultrasonic wave from the other side and receiving the ultrasonic wave at the one side in the fluid flowing through the conduit;

averaging the ultrasonic velocity A and the ultrasonic velocity B thereby to obtain an absolute ultrasonic velocity in the fluid;

obtaining a relationship between a temperature and a pressure by a difference between the reference ultrasonic velocity and the absolute ultrasonic velocity; and obtaining a pressure or a temperature of the fluid by the relationship and a predetermined temperature or a predetermined pressure of the fluid.

13. An ultrasonic thermometer or an ultrasonic pressure gage, which measures a temperature or a pressure of a fluid flowing through a conduit, comprising:

a first ultrasonic wave transmission and reception device disposed on the outside of the conduit;

a second ultrasonic wave transmission and reception device disposed on the outside of the conduit, the second device being spaced from the first ultrasonic wave transmission and reception device;

a first phase difference detector connected to the second ultrasonic wave transmission and reception device;

a first PLL type loop connection disposed between the first phase difference detector and the first ultrasonic wave transmission and reception device, said first PLL type loop connection being operative iteratively to adjust an output frequency until a phase difference detected by said first phase difference detector becomes zero, whereby a first frequency is selected;

a second phase difference detector connected to the first ultrasonic wave transmission and reception device;

a second PLL type loop connection disposed between the second phase difference detector and the second ultrasonic wave transmission and reception device, said second PLL type loop connection being operative iteratively to adjust an output frequency until a phase difference detected by said second phase difference detector becomes zero, whereby a second frequency is selected; and a measurement controller for obtaining a temperature or pressure of the fluid on the basis of said first frequency and said second frequency.

14. The ultrasonic thermometer or the ultrasonic pressure gage according to claim 13, wherein the first ultrasonic wave transmission and reception device may be constructed of a first ultrasonic wave transmitter and a first ultrasonic wave receiver, the second ultrasonic wave transmission and reception device may be constructed of a second ultrasonic wave transmitter and a second ultrasonic wave, the first phase difference detector and the second phase difference detector may be combined to be a phase difference detector, and the first loop connection and the second loop connection may be combined to be a loop connection.

15. An ultrasonic thermometer or an ultrasonic pressure gage, which measures a temperature or a pressure of a fluid flowing through a conduit, comprising:

an ultrasonic wave transmitter disposed in the conduit;

an ultrasonic wave receiver disposed at a predetermined distance from the ultrasonic wave transmitter;

a PLL circuit connected to the ultrasonic wave transmitter and the ultrasonic wave receiver, said PLL circuit being operative iteratively to adjust an output frequency of an oscillator until a detected phase difference becomes zero, whereby a first oscillating frequency is selected; and a measurement controller for obtaining said first oscillating frequency and converting the oscillating frequency to a flow rate;

wherein the PLL circuit has a phase difference detector for detecting a phase difference between an ultrasonic wave transmitted from the ultrasonic wave transmitter and an ultrasonic wave received by the ultrasonic wave receiver, an integrating circuit for integrating an output waveform outputted from the phase difference detector, and the oscillator, which is controlled by an output signal outputted from the integrating circuit.

16. An ultrasonic thermometer or an ultrasonic pressure gage, which measures a temperature or a pressure of a fluid flowing through a conduit, comprising:

an ultrasonic wave transmitter disposed in the conduit;

a first ultrasonic wave receiver and a second ultrasonic wave receiver disposed at a predetermined distances from the ultrasonic wave transmitter in the opposite directions;

a PLL circuit connected to the ultrasonic wave transmitter;

a switching device connected to the PLL circuit; and a measurement controller for obtaining an oscillating frequency of an oscillator and converting the oscillating frequency to a flow rate;

wherein the switching device alternatively changes connection of the PLL circuit to be connected either to the first ultrasonic wave receiver or to the second ultrasonic wave receiver respectively, and the PLL circuit has a phase differences detector for detecting a phase difference between an ultrasonic wave transmitted from the ultrasonic wave transmitter and an ultrasonic wave received by the first and second ultrasonic wave receivers, an integrating circuit for integrating an output waveform outputted from the phase difference detector and the oscillator, which is controlled by an output signal outputted from the integrating circuit.

17. An ultrasonic thermometer or an ultrasonic pressure gage, which measures a temperature or a pressure of a fluid flowing through a conduit, comprising:

an ultrasonic wave generator for generating an ultrasonic wave;

an ultrasonic wave transmitter disposed in the conduit, the transmitter transmitting an ultrasonic wave generated from the ultrasonic wave generator;

an ultrasonic wave receiver disposed at a predetermined distance from the ultrasonic wave transmitter;

a phase difference detector for detecting a phase difference between an ultrasonic wave transmitted from the ultrasonic wave transmitter and an ultrasonic wave received by the ultrasonic wave receiver;

an integrating circuit for integrating an output waveform outputted from the phase difference detector;

an oscillator controlled by an output signal outputted from the integrating circuit; and a measurement controller for obtaining an oscillating frequency of the oscillator when said phase difference is zero, and converting the oscillating frequency to a temperature or pressure.

* * * * *